United States Patent Office 2,968,690
Patented Jan. 17, 1961

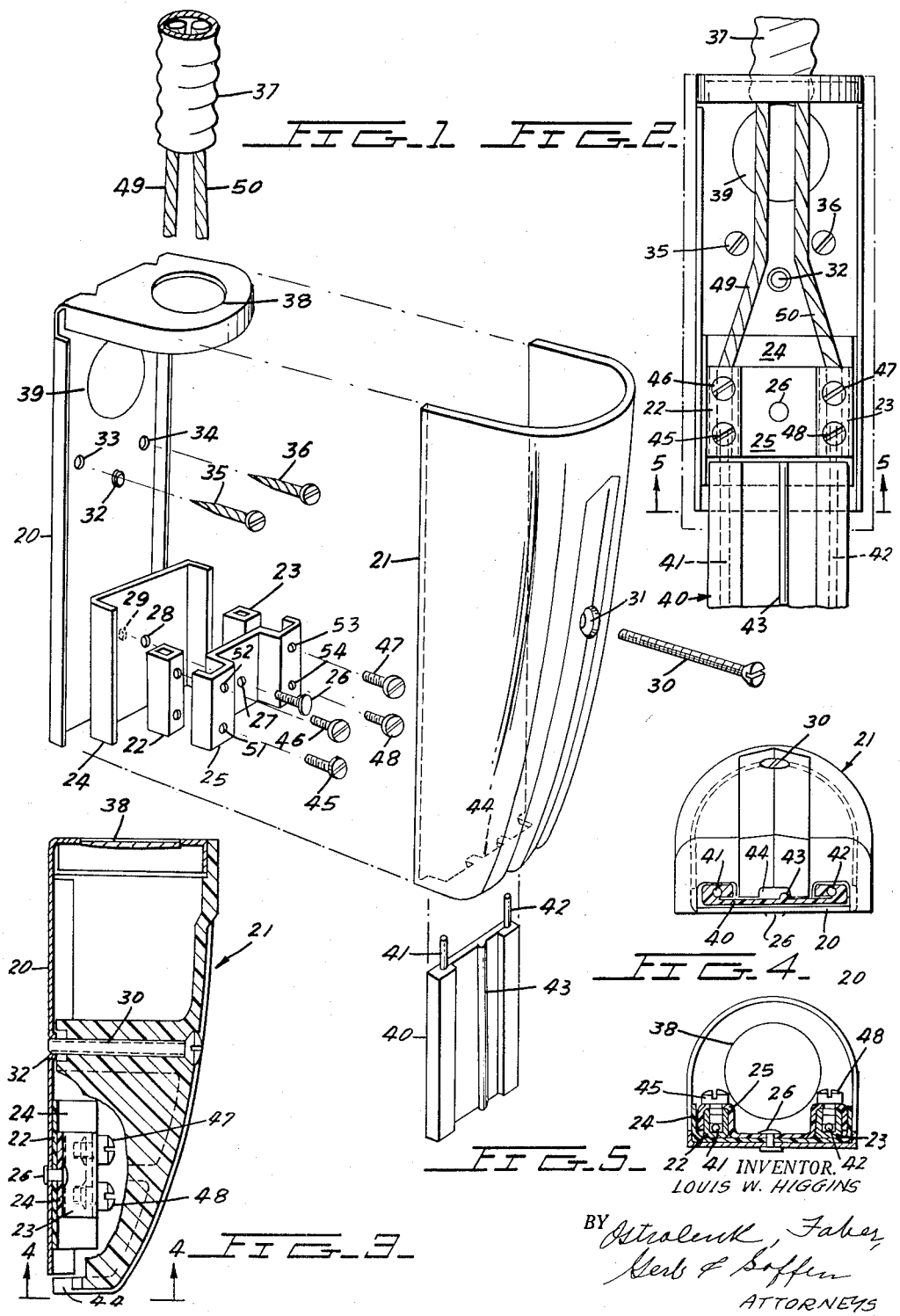

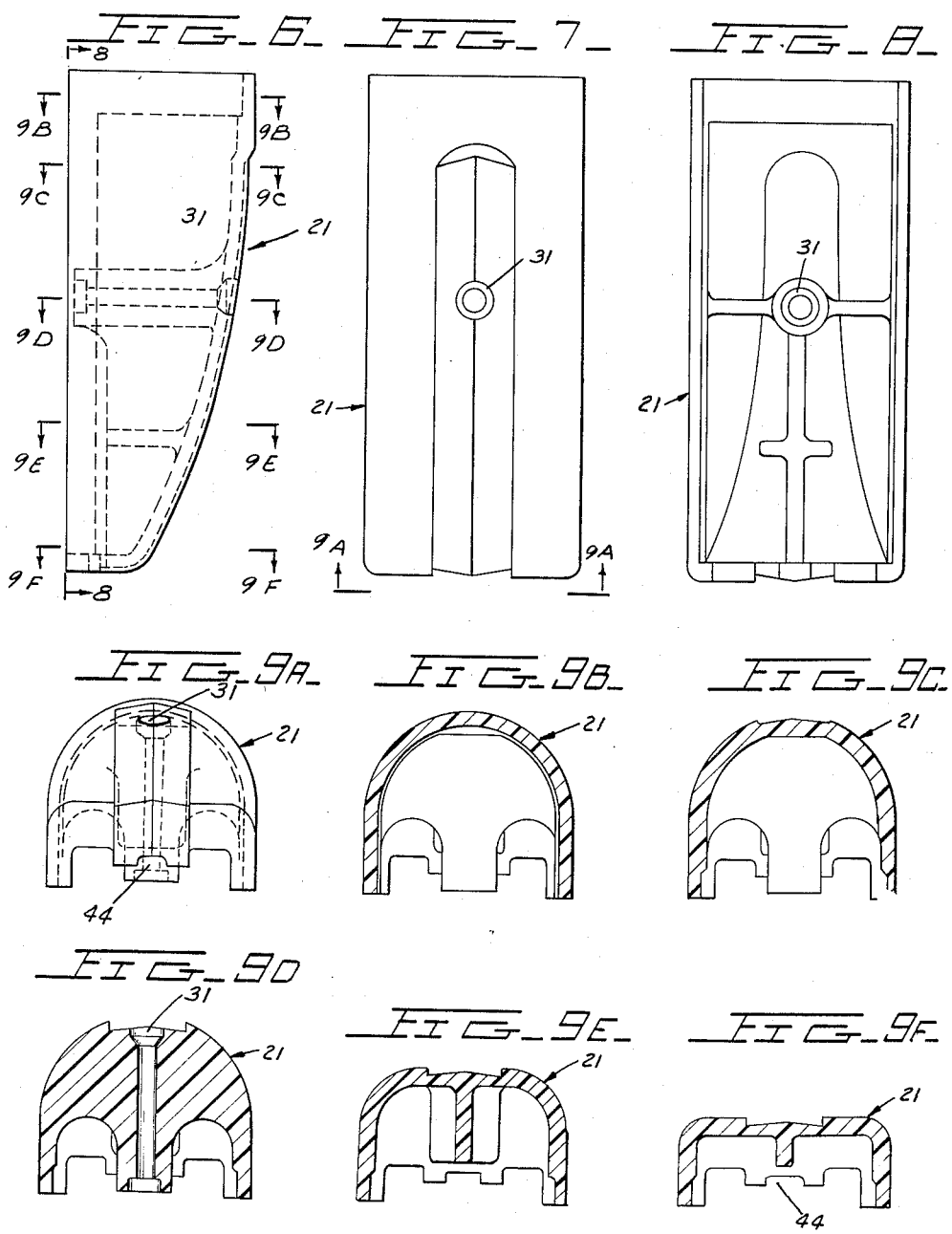

2,968,690
END FEED-IN DEVICE

Louis W. Higgins, Detroit, Mich., assignor, by mesne assignments, to I-T-E Circuit Breaker Company, Philadelphia, Pa., a corporation of Pennsylvania Filed May 4, 1956, Ser. No. 582,685

1 Claim. (Cl. 174—60)

My invention relates to an end feed-in device for electrical wiring embedded in a molded casing, and more specifically to an end feed-in device to be mounted to the same surface as the electrical wiring of the enclosed molding type, wherein standard conduit, armored cable or non-metallic sheathed cable may be brought therein through appropriately positioned knock-outs.

My novel end feed-in device is so constructed as to have electrical terminals positioned therein by a novel insulating arrangement, so that a single fastening means may be utilized to secure and position both the insulation and terminals to the base plate of the end feed-in device.

The terminals may be so constructed as to be hollow members which receive from one end the conduit leads, and electrical connections such as wiring of the enclosed molding type at the other end. Screws are then provided for securing the conduit and wiring leads to the terminals in such a manner that they serve a second purpose of securing the terminal insulation to the terminal. A cover means is then so constructed as to be fastenable to the base plate and the base plate is then adapted to be fastened to the surface on which the device is to be mounted.

Hence, my novel end feed-in device provides simplicity in both manufacture and application, in view of the simplified fastening for both the securing of the cover and the mounting of the device in the application, and the use of a single fastening means for assembling the insulation and terminals to the base plate during manufacture.

Accordingly, the primary object of my invention is to provide an end feed-in device for electrical wires of the enclosed molding type, which offers simplicity of both manufacture and application.

Another object of my invention is to fasten the electrical terminals and insulation therefor to a base plate by means of a single fastening means.

A still further object of my invention is to provide an arrangement whereby the screws for fastening electrical conductors to a terminal serve the further purpose of maintaining the electrical terminal insulation in place.

These and other objects of my invention will become apparent when taken in conjunction with the drawings in which.

Figure 1 shows an exploded perspective view of my novel end feed-in device.

Figure 2 shows a top view of the device of Figure 1, wherein both conduit and electrical wiring of the enclosed molding type have been connected to the terminals of the device.

Figure 3 is a cross-sectional side view of the device of Figure 1.

Figure 4 is a view taken along the lines 4—4 of Figure 3.

Figure 5 is a view taken across the lines 5—5 of Figure 2.

Figure 6 is a side view of the housing cover of Figure 1.

Figure 7 is a top view of the housing cover of Figure 1.

Figure 8 is a bottom view of the housing cover of Figure 1.

Figures 9A, 9B, 9C, 9D, 9E and 9F, are views taken across the lines A—A, B—B, C—C, D—D, E—E and F—F of Figures 6 and 7.

Referring now to Figure 1, my novel end feed-in device is shown as comprising a base plate 20, a housing cover 21, a first and second electrical terminals 22 and 23 respectively, a first insulation means 24 for insulating open ended tubular terminals 22 and 23 from the base plate 20, and a second insulating means 25 for insulating those portions of terminals 22 and 23 which extend beyond the first insulating body 24. A single fastening means 26 which could be a rivet or screw, or of that similar nature, is then provided to cooperate with opening 27 of the second insulating means 25, opening 28 of the first insulating means 24, and opening 29 of the base plate 20. In this way the terminals 22 and 23 are positioned in side to side relationship.

The cover 21 is then made to be fastenable to the base plate 20 by means of the screw 30, which may be inserted through the opening 31 of the housing 21, and into the cooperating thread 32 of the base plate 20. The base plate 20 is further provided with openings 33 and 34 which accept fastening members such as screws 35 and 36 for fastening the assembly device to a desired surface.

In order to provide access to a conduit such as the conduit or cable 37 knock-outs 38 and 39, may be provided. Similarly, the housing cover 21, which may be a plastic molding and will be more completely described hereinafter, is adapted at one end to receive the electrical wiring 41—42, which is enclosed in molding 40. This type of electrical wiring is more completely described in copending application Serial No. 556,907 filed January 3, 1956, and comprises a first and second electrical conductor 41 and 42 respectively embedded in a molded body 40. If desired, this electrical wiring may be polarized by providing an off-center protrusion 43, which would cooperate with notch or depression 44 of the housing 21 when inserted in the proper polarity.

In order to make electrical connection between the conduit 37 and the electrical wiring 40, their corresponding conductors are inserted in the terminals 22 and 23, and are maintained therein by means of the screws 45, 46, 47 and 48. That is, wires 41 and 42 will be maintained to terminals 22 and 23 respectively by means of the screws 45 and 48 respectively, and the conductors 49 and 50 of conduit 37 may be connected to terminals 22 and 23 respectively by the screw means 46 and 47 respectively.

It is to be noted that screws 45 through 48 pass through holes 51, 52, 53 and 54 respectively, of the insulation means 25, thereby serving the dual function of both maintaining the electrical conductors to their associated terminal, as well as maintaining the insulation means 25 to the terminals 22 and 23.

A side view of my novel device is shown in Figure 3 in the completely assembled state, wherein the operation of my novel single fastening means is clearly seen. That is to say, it is seen that a rivet 26 is the single fastening means in the assembly of the first insulating member 24, terminals 22 and 23, and the second insulating means 25.

It may be further seen from Figure 3, how the single screw 30 operates to attach the housing 21 to the base plate 20.

A top assembled view of Figure 1 may be seen in conjunction with Figure 2, which further shows the conduit leads 49 and 50 and the wiring leads 41 and 42 being connected to their respective terminal blocks 22 or 23. In the case of Figure 2, the conduit 37 is shown as being taken through knock-out 38. It is, however, clear that there would be cases in which this conduit would have been taken through knock-out 39.

Figure 4 shows a cross-sectional view of Figure 3 along the lines 4—4 of Figure 3 and further shows a cross-sectional view of a piece of electrical wiring of the enclosed molding type in place. It may further be seen in conjunction with Figure 4, a method by which my novel end feed-in device may be adapted to polarization. That is to say, the notch 44 of housing 21 may be so positioned and dimensioned as to preclude the insertion of protrusion 43 of molding 40, when this protrusion, which could be a measure of the polarization of the leads 41 and 42, is not properly positioned with respect to the notch.

The method by which the bare leads are fastened to the terminals 22 and 23 is further seen in Figure 5, which is a sectional view of Figure 2 along the lines 5—5, this figure further showing applicant's novel method of utilizing a single fastening means 26 for assembly of the insulation terminals and base.

It is specifically illustrated in Figure 5 that screws 45 and 48 serve the dual purpose of both maintaining leads 41 and 42 in position and at the same time maintain the insulation member 25 in rigid relationship with respect to the terminals 22 and 23.

It has been previously stated that the housing cover 21 could be molded of any desired plastic material. Figures 6, 7, 8 and 9A through 9F, show one form which a molded housing cover could take. Figure 6 which is a side view of the cover 21 shown in Figure 1, is seen in sectional views in each of Figures 9A through 9F. Similarly, Figure 7 is a top view of this molded housing 21 and Figure 8 is a side view of Figure 6 when seen across lines 8—8 of Figure 6.

In the foregoing, I have described my invention solely in connection with specific illustrative embodiments thereof. Since many variations and modifications of the invention will now be obvious to those skilled in the art, I prefer to be bound not by the specific disclosure herein contained but only by the appended claim.

I claim:

An end feed-in device for electrical energy; said device comprising a base plate, a cover, a first and second tubular terminal open at both ends, a first and second insulating means and a single fastening means; said first and second terminals being positioned adjacent to said base plate; said first and second terminals being insulated from said base plate by said first insulating means; said second insulating means being constructed to surround an exposed outer area of each of said first and second terminals extending from said first insulating means and thereby positioning said first and second terminals with respect to one another; said first and second terminals being provided with connecting means for connecting electrical conductors to said first and second terminals; said connecting means being further constructed to fasten said second insulating means to said first and second terminals; said single fastening means being constructed to fasten a portion of each of said first and second insulating means intermediate between said first and second terminals to said base plate to thereby position and maintain said first and second terminals with respect to said base plate in side by side spaced parallel relationship; said cover being fastenable to said base plate, said base plate being provided with mounting means for mounting said device; said base plate including a first portion having an opening into which said single fastening means is entered; said base plate also including a second portion at right angles to said first portion positioned at one end of said cover; a knockout in each of said first and said second portions for introducing electrical cable to said terminals said cover at the other end thereof having an elongated depression to receive a portion of a continuous outlet cable; said cover also having a first and a second notch extending in the same direction, communicating with said depression at opposite ends thereof, and adapted to receive conductor encompassing portions of a continuous outlet cable whose conductors are inserted into the tubular conductors; said cover further having another notch communicating with said depression positioned between said previously recited notches, and extending in the same direction; said last recited notch being constructed and operatively positioned to receive a continuous outlet cable polarizing rib.

References Cited in the file of this patent

UNITED STATES PATENTS

| | | |
|---|---|---|
| 1,148,699 | McWilliams | Aug. 3, 1915 |
| 1,412,748 | McKay | Apr. 11, 1922 |
| 1,983,157 | Wermine | Dec. 4, 1934 |
| 2,088,845 | De Mask | Aug. 3, 1937 |
| 2,272,432 | Rogie | Feb. 10, 1942 |
| 2,288,139 | Moore | June 30, 1942 |
| 2,427,965 | Henderson | Sept. 23, 1947 |
| 2,611,800 | Naughton | Sept. 23, 1952 |

OTHER REFERENCES

Publication I, "Wiremold Catalog and Wiring Guide No. 17," published 1949 by Wiremold Company, Hartford 10, Conn. (page 32, figure showing connector block 5730A mounted in 5720, and page 43 relied on).